United States Patent
Yi et al.

(10) Patent No.: US 8,747,082 B2
(45) Date of Patent: Jun. 10, 2014

(54) ELECTRIC WATER PUMP

(75) Inventors: Jeawoong Yi, Hwaseong-si (KR); Seung Yong Lee, Yongin-si (KR); Gyuhwan Kim, Suwon-si (KR); Yun Seok Kim, Yongin-si (KR); Yong Sun Park, Yongin-si (KR); Tae-Sung Oh, Ansan-si (KR); Kyung-Hwan Kim, Incheon-si (KR); Jong-Hoon Lee, Incheon-si (KR); Kwang-Ho Lee, Cheonan-si (KR)

(73) Assignees: Hyundai Motor Company, Seoul (KR); Amotech Co., Ltd., Incheon-Si (KR); Myunghwa Ind. Co., Ltd., Seoul (KR); Kia Motors Corporation, Seoul (KR)

( * ) Notice: Subject to any disclaimer, the term of this patent is extended or adjusted under 35 U.S.C. 154(b) by 572 days.

(21) Appl. No.: 12/847,950

(22) Filed: Jul. 30, 2010

(65) Prior Publication Data
US 2011/0116947 A1   May 19, 2011

(30) Foreign Application Priority Data
Nov. 19, 2009   (KR) .................. 10-2009-0112235

(51) Int. Cl.
*F04B 35/04* (2006.01)
*F04B 39/06* (2006.01)

(52) U.S. Cl.
USPC ............... 417/423.7; 417/423.14; 417/423.1; 417/366

(58) Field of Classification Search
USPC ............ 417/410.1, 357, 423.1, 423.7, 423.8, 417/423.14
See application file for complete search history.

(56) References Cited

U.S. PATENT DOCUMENTS

| | | | |
|---|---|---|---|
| 2,713,311 A | 7/1955 | White | |
| 2,718,193 A | 9/1955 | Zimsky | |
| 2,906,208 A * | 9/1959 | White | 417/357 |
| 2,925,041 A | 2/1960 | Miroslav | |
| 3,053,189 A * | 9/1962 | White | 417/357 |
| 3,135,211 A * | 6/1964 | Pezzillo | 417/357 |
| 3,138,105 A * | 6/1964 | White | 417/357 |
| 3,220,349 A * | 11/1965 | White | 417/357 |
| 3,223,043 A | 12/1965 | Harris | |
| 3,967,915 A * | 7/1976 | Litzenberg | 415/211.1 |
| 4,080,112 A | 3/1978 | Zimmermann | |

(Continued)

FOREIGN PATENT DOCUMENTS

| | | |
|---|---|---|
| CN | 1250554 A | 4/2000 |
| CN | 1307741 A | 8/2001 |

(Continued)

*Primary Examiner* — Charles Freay
*Assistant Examiner* — Alexander Comley
(74) *Attorney, Agent, or Firm* — Morgan, Lewis & Bockius LLP

(57) ABSTRACT

The present invention relates to an electric water pump having improved performance and durability. The electric water pump may include a stator generating a magnetic field according to a control signal, a rotor rotated by the magnetic field, a pump cover having an inlet and an outlet, a body having a front surface forming a volute chamber, a stator chamber, and a rotor chamber, the stator mounted in the stator chamber and the rotor mounted in the rotor chamber, a shaft having a central axis, fixed to the rotor and mounted in the rotor chamber, and an impeller fixed to the shaft so as to rotate together with the shaft, pressurizing the coolant having flowed in through the inlet, and mounted in the volute chamber, wherein the rotor chamber is fluidly connected to the volute chamber, and the stator chamber is fluidly closed and sealed from the rotor chamber.

16 Claims, 2 Drawing Sheets

(56) References Cited

U.S. PATENT DOCUMENTS

| | | | |
|---|---|---|---|
| 4,465,437 A | 8/1984 | Jensen et al. | |
| 4,886,430 A | 12/1989 | Veronesi et al. | |
| 4,890,988 A | 1/1990 | Kraemer et al. | |
| 5,009,578 A * | 4/1991 | Hyland | 417/365 |
| 5,044,897 A | 9/1991 | Dorman | |
| 5,129,795 A * | 7/1992 | Hyland | 417/423.12 |
| 5,156,535 A | 10/1992 | Budris et al. | |
| 5,160,246 A * | 11/1992 | Horiuchi | 417/365 |
| 5,184,945 A | 2/1993 | Chi-Wei | |
| 5,297,940 A | 3/1994 | Buse | |
| 5,302,091 A | 4/1994 | Horiuchi | |
| 5,407,331 A | 4/1995 | Atsumi | |
| 5,464,333 A | 11/1995 | Okada et al. | |
| 5,580,216 A | 12/1996 | Munsch | |
| 5,830,258 A | 11/1998 | Yamashita et al. | |
| 5,890,880 A | 4/1999 | Lustwerk | |
| 5,915,931 A | 6/1999 | Lindner et al. | |
| 5,924,851 A | 7/1999 | Obata et al. | |
| 5,997,261 A * | 12/1999 | Kershaw et al. | 417/366 |
| 6,012,909 A * | 1/2000 | Sloteman et al. | 417/366 |
| 6,018,208 A | 1/2000 | Maher et al. | |
| 6,027,318 A | 2/2000 | Shimanuki et al. | |
| 6,036,456 A | 3/2000 | Peters et al. | |
| 6,078,121 A | 6/2000 | Poag et al. | |
| 6,082,974 A * | 7/2000 | Takemoto et al. | 417/366 |
| 6,102,674 A | 8/2000 | Strauch et al. | |
| 6,302,661 B1 | 10/2001 | Khanwilkar et al. | |
| 6,350,109 B1 * | 2/2002 | Brunet et al. | 417/365 |
| 6,447,269 B1 * | 9/2002 | Rexroth et al. | 417/365 |
| 6,464,471 B1 | 10/2002 | Mathis et al. | |
| 6,477,269 B1 | 11/2002 | Brechner | |
| 6,722,854 B2 | 4/2004 | Forsberg | |
| 6,817,845 B2 * | 11/2004 | Angle et al. | 417/423.7 |
| 6,844,640 B2 * | 1/2005 | Abe et al. | 310/89 |
| 6,884,043 B2 * | 4/2005 | Kimberlin et al. | 417/355 |
| 6,896,494 B2 * | 5/2005 | Sunaga et al. | 417/423.1 |
| 7,033,146 B2 | 4/2006 | Shi | |
| 7,074,019 B2 * | 7/2006 | Knoll | 417/423.14 |
| 7,221,073 B2 | 5/2007 | Yamada et al. | |
| 7,300,263 B2 | 11/2007 | Mitsuda et al. | |
| 2002/0150486 A1 | 10/2002 | Cooper et al. | |
| 2004/0037719 A1 * | 2/2004 | Sunaga et al. | 417/423.8 |
| 2004/0062664 A1 * | 4/2004 | Weigold et al. | 417/357 |
| 2004/0115077 A1 | 6/2004 | Iwanari | |
| 2005/0025642 A1 * | 2/2005 | Deai | 417/423.12 |
| 2005/0254971 A1 | 11/2005 | Ohya et al. | |
| 2006/0057002 A1 * | 3/2006 | Nakanishi | 417/423.7 |
| 2006/0057005 A1 | 3/2006 | Williams et al. | |
| 2006/0057006 A1 * | 3/2006 | Williams et al. | 417/423.14 |
| 2006/0245956 A1 * | 11/2006 | Lacroix et al. | 417/423.1 |
| 2007/0018521 A1 * | 1/2007 | Ishiguro et al. | 310/156.43 |
| 2007/0086905 A1 | 4/2007 | Nagata et al. | |
| 2007/0114867 A1 | 5/2007 | Marioni | |
| 2007/0243086 A1 * | 10/2007 | Sakai et al. | 417/423.1 |
| 2008/0019850 A1 * | 1/2008 | Tajima et al. | 417/410.1 |
| 2008/0100165 A1 | 5/2008 | Alston et al. | |
| 2008/0112824 A1 * | 5/2008 | Sawasaki et al. | 417/423.7 |

FOREIGN PATENT DOCUMENTS

| | | |
|---|---|---|
| CN | 1434557 A | 8/2003 |
| CN | 1484883 A | 3/2004 |
| CN | 1773122 A | 5/2006 |
| CN | 1952379 A | 4/2007 |
| CN | 200993106 Y | 12/2007 |
| CN | 201332347 Y | 10/2009 |
| JP | 2-84032 A | 3/1990 |
| JP | 9-324787 A | 12/1997 |
| JP | 2000-278924 A | 10/2000 |
| JP | 2001-136700 A | 5/2001 |
| JP | 2003-3984 A | 1/2003 |
| JP | 2004-129369 A | 4/2004 |
| JP | 2004-512462 A | 4/2004 |
| JP | 2004-183595 A | 7/2004 |
| JP | 2004-282989 A | 10/2004 |
| JP | 2005-287149 A | 10/2005 |
| JP | 2007-205246 A | 8/2007 |
| JP | 2007-318987 A | 12/2007 |
| JP | 2008-8222 A | 1/2008 |
| JP | 2008-175090 A | 7/2008 |
| JP | 2009-177985 A | 8/2009 |
| KR | 1998-062328 U | 11/1998 |
| KR | 2002-0064360 A | 8/2002 |
| KR | 10-2007-0053123 A | 5/2007 |
| KR | 10-0908396 B1 | 7/2009 |
| WO | WO 2009/038302 A2 | 3/2009 |
| WO | WO 2009/056271 A1 | 5/2009 |

* cited by examiner

ELECTRIC WATER PUMP

CROSS-REFERENCE TO RELATED APPLICATION

The present application claims priority to Korean Patent Application No. 10-2009-0112235 filed on Nov. 19, 2009, the entire contents of which is incorporated herein for all purposes by this reference.

BACKGROUND OF THE INVENTION

1. Field of the Invention

The present invention relates to an electric water pump. More particularly, the present invention relates to an electric water pump having improved performance and durability.

2. Description of Related Art

Generally, a water pump circulates coolant to an engine and a heater in order to cool the engine and heat a cabin. The coolant flowing out from the water pump circulates through and exchanges heat with the engine, the heater, or the radiator, and flows back in the water pump. Such a water pump is largely divided into a mechanical water pump and an electric water pump.

The mechanical water pump is connected to a pulley fixed to a crankshaft of the engine and is driven according to rotation of the crankshaft (i.e., rotation of the engine). Therefore, the coolant amount flowing out from the mechanical water pump is determined according to rotation speed of the engine. However, the coolant amount required in the heater and the radiator is a specific value regardless of the rotation speed of the engine. Therefore, the heater and the radiator do not operate normally in a region where the engine speed is slow, and in order to operate the heater and the radiator normally, the engine speed must be increased. However, if the engine speed is increased, fuel consumption of a vehicle also increases.

On the contrary, the electric water pump is driven by a motor controlled by a control apparatus. Therefore, the electric water pump can determines the coolant amount regardless of the rotation speed of the engine. Since components used in the electric water pump, however, are electrically operated, it is important for electrically operated components to have sufficient waterproof performance. If the components have sufficient waterproof performance, performance and durability of the electric water pump may also improve.

Currently, the number of vehicles having an electric water pump is tending to increase. Accordingly, various technologies for improving performance and durability of the electric water pump are being developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electric water pump having advantages of improved performance and durability.

In an aspect of the present invention, the electric water pump may include a stator generating a magnetic field according to a control signal, a rotor enclosed by the stator and rotated by the magnetic field generated at the stator, a pump cover having an inlet through which coolant flows in and an outlet through which pressurized coolant flows out, a body having a front surface forming a volute chamber between the pump cover and the front surface, a stator chamber formed at an outer portion of the body in a radial direction and the stator being mounted in the stator chamber, and a rotor chamber formed at an inner portion of the body in a radial direction and the rotor being mounted in the rotor chamber, a shaft having a central axis, fixed to the rotor so as to rotate together with the rotor about the central axis, and mounted in the rotor chamber, and an impeller fixed to a front portion of the shaft so as to rotate together with the shaft, pressurizing the coolant having flowed in through the inlet, and mounted in the volute chamber, wherein the rotor chamber is fluidly connected to the volute chamber, and the stator chamber is fluidly closed and sealed from the rotor chamber.

The front portion of the shaft may be protruded to the volute chamber through the front surface of the body, and the impeller is fixed in the volute chamber to the front portion of the shaft that is protruded.

The pump cover may have a slanted surface slanted with reference to the central axis with a predetermined angle, and the impeller has a confronting surface corresponding to the slanted surface at a front end portion thereof, and wherein an intersecting point of lines extended from the slanted surface is positioned on the central axis.

A first bearing may be disposed between the shaft and the front surface of the body in the rotor chamber in order to reduce rotational friction of the shaft, wherein the rotor is formed in an unsymmetrical shape so as to generate thrust toward the front surface of the body, wherein a cup is mounted between the first bearing and the rotor on the shaft in order to prevent interference and collision of the shaft and the first bearing by the thrust, and a thrust ring is mounted between the cup and the first bearing for smooth rotation of the shaft, and wherein the cup is made of a rubber material and the thrust ring is made of a ceramic material.

In another aspect of the present invention, the electric water pump may include a driver case detachably mounted at a rear end of the body and formed of a driver chamber therein, and a driver mounted in the driver chamber and applying the control signal to the stator.

The front surface of the body may have a first stator mounting surface protruded rearward therefrom, and the driver case has a second stator mounting surface protruded forward from a front surface of the driver case, and wherein the stator chamber and the rotor chamber are separately formed by mounting a front end portion of the stator at the first stator mounting surface with sealing means being interposed therebetween and by mounting a rear end portion of the stator at the second stator mounting surface with sealing means being interposed therebetween.

A second bearing may be disposed between a rear end portion of the shaft and the front surface of the driver case in order to reduce a rotational friction of the shaft wherein the second bearing is disposed between a stepped portion of the shaft at a rear side of the shaft and the front surface of the driver case in order to reduce the rotational friction of the shaft.

In further another aspect of the present invention, the stator may include a stator core formed by stacking a plurality of pieces made of a magnetic material, an insulator connecting pieces of the stator core to each other, a coil coiling the stator core so as to form a magnetic path, and a stator case wrapping and sealing the stator core, the insulator, and the coil.

The stator case may be made of a bulk mold compound including a potassium family that has a low coefficient of contraction.

The stator may further include a Hall sensor detecting a position of the rotor, and a Hall sensor board controlling the control signal supplied to the stator according to a position of the rotor detected by the Hall sensor.

The Hall sensor and the Hall sensor board may also be wrapped and sealed by the stator case to form a single body.

In still another aspect of the present invention, the rotor may include a rotor core having a hollow cylindrical shape and made of a magnetic material, a permanent magnet mounted at an exterior circumference of the rotor core, a rotor cover mounted at both distal ends of the rotor core and the permanent magnet so as to fix the rotor core and the permanent magnet together, and a rotor case wrapping an exterior circumference of the rotor core and the permanent magnet so as to fix the rotor core and the permanent magnet in a state that the rotor core and the permanent magnet are mounted at the rotor cover, wherein the rotor case is made of a bulk mold compound including a potassium family that has a low coefficient of contraction.

A first bearing may be disposed between the shaft and the front surface of the body in the rotor chamber and a cup is mounted between the first bearing and the rotor cover on the shaft in order to prevent interference and collision of the shaft and the first bearing by the thrust, and a thrust ring is mounted between the cup and the first bearing for smooth rotation of the shaft, wherein the cup is made of a rubber material and the thrust ring is made of a ceramic material.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
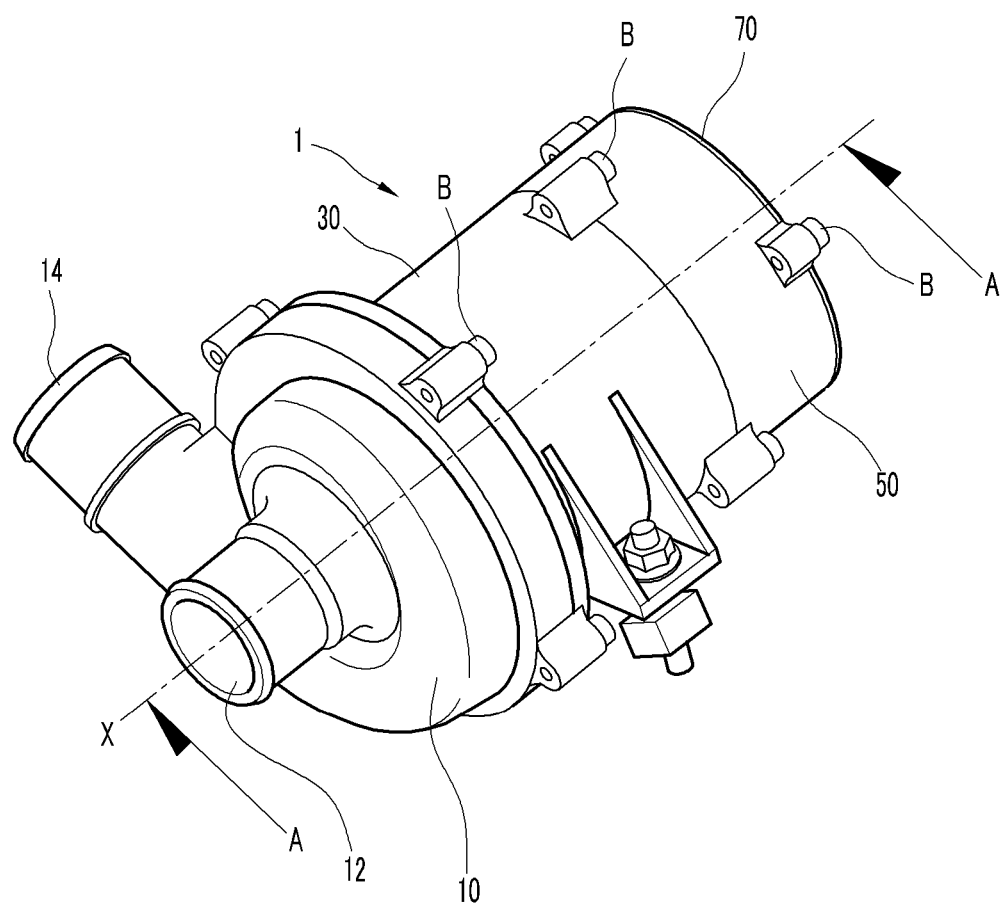
FIG. 1 is a perspective view of an exemplary electric water pump according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
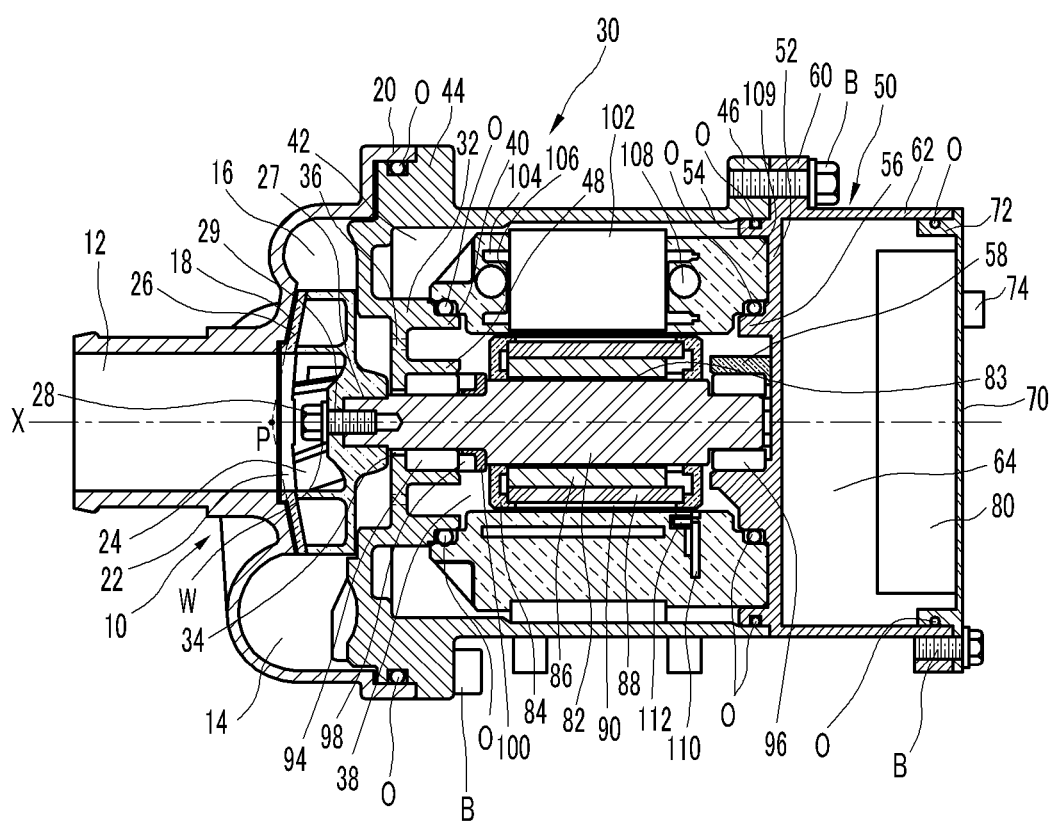
FIG. 2 is a cross-sectional view taken along the line A-A in FIG. 1.

FIG. 1 is a perspective view of an electric water pump according to an exemplary embodiment of the present invention, and FIG. 2 is a cross-sectional view taken along the line A-A in FIG. 1.

As shown in FIG. 1 and FIG. 2, an electric water pump 1 according to an exemplary embodiment of the present invention includes a pump cover 10, a body 30, a driver case 50, and a driver cover 70. The body 30 is engaged to a rear end of the pump cover 10 so as to form a volute chamber 16, the driver case 50 is engaged to a rear end of the body 30 so as to form a rotor chamber 38 and a stator chamber 42, and the driver cover 70 is engaged to a rear end of the driver case 50 so as to form a driver chamber 64.

In addition, an impeller 22 is mounted in the volute chamber 16, a rotor (84, 86, 88, and 90) fixed to a shaft 82 is mounted in the rotor chamber 38, a stator (102, 104, 108, and 109) is mounted in the stator chamber 42, and a driver 80 is mounted in the driver chamber 64. The shaft 82 has a central axis x, and the rotor (84, 86 88, and 90) as well as the shaft 82 rotate about the central axis x. The stator (102, 104, 108, and 109) is disposed coaxially with the central axis x of the shaft 82.

The pump cover 10 is provided with an inlet 12 at a front end portion thereof and an outlet 14 at a side portion thereof. Therefore, the coolant flows in the electric water pump 1 through the inlet 12, and the pressurized coolant in the electric water pump 1 flows out through the outlet 14. A slanted surface 18 is formed at a rear end portion of the inlet 12 of the pump cover 10, and a rear end portion 20 of the pump cover 10 is extended rearward from the slanted surface 18. The rear end portion 20 of the pump cover 10 is engaged to a cover mounting portion 44 of the body 30 by fixing means such as a bolt B. The slanted surface 18 is slanted with reference to the central axis x of the shaft 82, and an intersecting point P of lines extended from the slanted surface 18 is located on the central axis x of the shaft 82.

The volute chamber 16 for pressurizing the coolant is formed in the pump cover 10, and the impeller 22 for pressurizing and discharging the coolant through the outlet 14 is mounted in the volute chamber 16. The impeller 22 is fixed to a front end portion of the shaft 82 and rotates together with the shaft 82. For this purpose, a bolt hole 29 is formed at a middle portion of the impeller 22 and a thread is formed at an interior circumference of the bolt hole 29. Therefore, an impeller bolt 28 inserted in the bolt hole 29 is threaded to the front end portion of the shaft 82 such that the impeller 22 is fixed to the shaft 82. A washer w may be interposed between the impeller 22 and the impeller bolt 28.

The impeller 22 is provided with a confronting surface 26 corresponding to the slanted surface 18 at the front end portion thereof. Therefore, an intersecting point of lines extended from the confronting surface 26 is also positioned on the central axis x of the shaft 82. The coolant having flowed into the water pump 1 may be smoothly guided and performance of the water pump 1 may be improved as a consequence of disposing centers of the impeller 22 and the rotor (84, 86, 88, and 90) that are rotating elements of the water pump 1 and a center of the stator (102, 104, 108, and 109) that is a fixed element of the water pump 1 on the central axis x.

In addition, the impeller 22 is divided into a plurality of regions by a plurality of blades 24. The coolant having flowed into the plurality of regions is pressurized by rotation of the impeller 22.

The body 30 has a hollow cylindrical shape that is opened rearward, and is engaged to the rear end of the pump cover 10. The body 30 includes a front surface 32 forming the volute chamber 16 with the pump cover 10, the stator chamber 42 that is formed at an external circumferential portion of the body 30 and in which the stator (102, 104, 108, and 109) is mounted, and the rotor chamber 38 that is formed at an interior circumferential portion of the stator chamber 42 and in which the rotor (84, 86, 88, and 90) is mounted.

The front surface 32 of the body 30 is provided with the cover mounting portion 44, a first stator mounting surface 40, a first bearing mounting surface 48, and a penetration hole 34 formed sequentially from an exterior circumference to a center thereof.

The cover mounting portion 44 is engaged to the rear end portion 20 of the pump cover 10. Sealing means such as an O-ring O may be interposed between the cover mounting portion 44 and the rear end portion 20 in order to prevent leakage of the coolant from the volute chamber 16.

The first stator mounting surface 40 is protruded rearward from the front surface 32, and defines a boundary between the stator chamber 42 and the rotor chamber 38. In a state that the sealing means such as an O-ring O is mounted at the first stator mounting surface 40, the front end of the stator (102, 104, 108, and 109) is mounted at the first stator mounting surface 40.

The first bearing mounting surface 48 is protruded rearward from the front surface 32. A first bearing 94 is interposed between the first bearing mounting surface 48 and the front end portion of the shaft 82 in order to make the shaft 82 smoothly rotate and to prevent the shaft 82 from being inclined.

The penetration hole 34 is formed at a middle portion of the front surface 32 such that the front end portion of the shaft 82 is protruded to the volute chamber 16 through the penetration hole 34. The impeller 22 is fixed to the shaft 82 in the volute chamber 16. It is exemplarily described in this specification that the impeller 22 is fixed to the shaft 82 by the impeller bolt 28. However, the impeller 22 may be press-fitted to an exterior circumference of the shaft 82.

Meanwhile, a connecting hole 36 is formed at the front surface 32 between the first stator mounting surface 40 and the first bearing mounting surface 48. Therefore, the rotor chamber 38 is fluidly connected to the volute chamber 16. Heat generated at the shaft 82, the rotor (84, 86, 88, and 90), and the stator (102, 104, 108, and 109) by operation of the water pump 1 is cooled by the coolant flowing in and out through the connecting hole 36. Therefore, durability of the water pump 1 may improve. In addition, floating materials in the coolant are prevented from being accumulated in the rotor chamber 38.

The rotor chamber 38 is formed at a middle portion in the body 30. The shaft 82 and the rotor (84, 86, 88, and 90) is mounted in the rotor chamber 38.

A stepped portion 83, the diameter of which is larger than that of the other part, is formed at a middle portion of the shaft 82. According to an exemplary embodiment of the present invention, a hollow shaft 82 may be used.

The rotor (84, 86, 88, and 90) is fixed on the stepped portion 83 of the shaft 82, and is formed in an unsymmetrical shape. Thrust is exerted on the shaft 82 toward the front surface 32 by the unsymmetrical shape of the rotor (84, 86, 88, and 90) and a pressure difference between the volute chamber 16 and the rotor chamber 38. The thrust generated at the shaft 82 pushes the shaft 82 toward the front surface 32. Thereby, the stepped portion 83 of the shaft 82 may be interfere and collide with the first bearing 94 and the first bearing 94 may be damaged, accordingly. In order to prevent interference and collision of the stepped portion 83 of the shaft 82 and the first bearing 94, a cup 100 is mounted between the stepped portion 83 of the shaft 82 and the first bearing 94. Such a cup 100 is made of an elastic rubber material, and relieves the thrust of the shaft 82 exerted to the first bearing 94.

Meanwhile, in a case that the cup 100 directly contacts the first bearing 94, the thrust of the shaft 82 exerted to the first bearing 94 can be relieved. However, rotation friction may be generated between the first bearing 94 and the cup 100 of a rubber material, and thereby performance of the water pump 1 may be deteriorated. Therefore, a thrust ring 98 is mounted between the cup 100 and the first bearing 94 in order to reduce the rotation friction between the first bearing 94 and the cup 100. That is, the cup 100 reduces the thrust of the shaft 82 and the thrust ring 98 reduces the rotation friction of the shaft 82. It is exemplarily described in this specification that a groove is formed at an exterior circumference of the cup 100 and the thrust ring 98 is mounted in the groove. However, a method for installing the thrust ring 98 to the cup 100 is not limited to the exemplary embodiment of the present invention. For example, a groove may be formed at a middle portion of the cup 100 and the thrust ring 98 may be mounted in this groove. Further, it is to be understood that any thrust ring 98 interposed between the cup 100 and the first bearing 94 may be included in the spirit of the present invention.

The rotor (84, 86, 88, and 90) includes a rotor core 86, a permanent magnet 88, a rotor cover 84, and a rotor case 90.

The magnetic rotor core 86 has a cylindrical shape and is fixed to the stepped portion 83 of the shaft 82 by press-fitting or welding. The rotor core 86 is provided with a plurality of recesses (not shown) formed along a length direction thereof at an exterior circumference thereof, and the permanent magnet 88 is insertedly mounted in each recesses.

The permanent magnet 88 is mounted at the exterior circumference of the rotor core 86.

A pair of rotor covers 84 are mounted at both ends of the rotor core 86 and the permanent magnet 88. The rotor cover 84 primarily fixes the rotor core 86 and the permanent magnet 88, and is made of copper or stainless steel that has high specific gravity.

In a state in which the rotor core 86 and the permanent magnet 88 are mounted to the rotor cover 84, the rotor case 90 wraps exterior circumferences of the rotor core 86 and the permanent magnet 88 so as to secondarily fix them. The rotor case 90 is made of a bulk mold compound (BMC) including a potassium family that has a low coefficient of contraction. A method for manufacturing the rotor case 90 will be briefly described.

The rotor core 86 and the permanent magnet 88 are mounted to the rotor cover 84, and the rotor cover 84 to which the rotor core 86 and the permanent magnet 88 are mounted is inserted in a mold (not shown). After that, the bulk mold compound including the potassium family is melted and high temperature (e.g., 150° C.) and high pressure BMC is flowed into the mold. Then, the BMC is cooled in the mold. As described above, if the rotor case 90 is made of BMC having the low coefficient of contraction, the rotor case 90 can be precisely manufactured. In general, the coefficient of contraction of a resin is 4/1000-5/1000, but the coefficient of contraction of the BMC is about 5/10,000. If the rotor case 90 is manufactured by flowing the high temperature resin into the mold, the rotor case 90 is contracted and does not have a target shape. Therefore, if the rotor case 90 is manufactured by the BMC including the potassium family that has the low coefficient of contraction, contraction of the rotor case 90 by cooling may be reduced and the rotor case 90 may be precisely manufactured. In addition, since BMC including the potassium family has good heat-radiating performance, the rotor can be cooled independently. Therefore, the water pump may be prevented from being heat damaged.

In addition, according to a conventional method for manufacturing the rotor, the permanent magnet is fixed to the exterior circumference of the rotor core with glue. However, as the rotor rotates, high temperature and high pressure are generated near the rotor. Thereby, the glue may be melted or the permanent magnet may be disengaged from the rotor core. The permanent magnet 88 mounted to the rotor core 86, on the contrary, is fixed primarily by the rotor cover 84 and secondarily by the rotor case 90 according to an exemplary embodiment of the present invention. Thus, the permanent magnet 88 may not be disengaged from the rotor core 86.

The stator chamber 42 is formed in the body 30 at a radially outer portion of the rotor chamber 38. The stator (102, 104, 108, and 109) is mounted in the stator chamber 42.

The stator (102, 104, 108, and 109) is fixed to the body 30 directly or indirectly, and includes a stator core 102, an insulator 104, a coil 108, and a stator case 109.

The stator core 102 is formed by stacking a plurality of pieces made of a magnetic material. That is, the plurality of thin pieces are stacked up such that the stator core 102 has a target thickness.

The insulator 104 connects the pieces making up the stator core 102 to each other, and is formed by molding a resin. That is, the stator core 102 formed by stacking the plurality of pieces is inserted in a mold (not shown), and then molten resin is injected into the mold. Thereby, the stator core 102 at which the insulator 104 is mounted is manufactured. At this time, coil mounting recesses 106 are formed at front and rear end portions of the stator core 102 and the insulator 104.

The coil 108 is coiled at an exterior circumference of the stator core 102 so as to form a magnetic path.

The stator case 109 wraps and seals the stator core 102, the insulator 104, and the coil 108. The stator case 109, the same as the rotor case 90, is manufactured by insert molding the BMC including the potassium family.

In addition, when the stator case 109 is insert molded, a Hall sensor 112 and a Hall sensor board 110 may also be insert molded. That is, the stator (102, 104, 108, and 109), the Hall sensor 112, and the Hall sensor board 110 may be integrally manufactured as one component.

The Hall sensor 112 detects the position of the rotor (84, 86, 88, and 90). A mark (not shown) for representing the position thereof is formed at the rotor (84, 86, 88, and 90), and the Hall sensor 112 detects the mark in order to detect the position of the rotor (84, 86, 88, and 90).

The Hall sensor board 110 controls a control signal delivered to the stator 101 according to the position of the rotor (84, 86, 88, and 90) detected by the Hall sensor. That is, the Hall sensor board 110 makes a strong magnetic field be generated at one part of the stator 101 and a weak magnetic field be generated at the other part of the stator (102, 104, 108, and 109) according to the position of the rotor (84, 86, 88, and 90). Thereby, initial mobility of the water pump 1 may be improved.

A case mounting portion 46 is formed at an exterior surface of the rear end of the body 30.

The driver case 50 is engaged to the rear end of the body 30, and is formed of a case surface 52 at a front end portion thereof. The rotor chamber 38 and the stator chamber 42 are formed in the body 30 by engaging the driver case 50 to the rear end portion of the body 30. A body mounting portion 60 is formed at an external circumference of the front end portion of the driver case 50 and is engaged to the case mounting portion 46 by fixing means such as a bolt B.

The case surface 52 is provided with an insert portion 54, a second stator mounting surface 56, and a second bearing mounting surface 58 formed sequentially from an exterior circumference to a center thereof.

The insert portion 54 is formed at an external circumferential portion of the case surface 52 and is protruded forward. The insert portion 54 is inserted in and closely contacted to the rear end portion of the body 30. Sealing means such as an O-ring O is interposed between the insert portion 54 and the rear end portion of the body 30 so as to close and seal the stator chamber 42.

The second stator mounting surface 56 is protruded forward from the case surface 52 so as to define the boundary between the stator chamber 42 and the rotor chamber 38. The rear end of the stator (102, 104, 108, and 109) is mounted at the second stator mounting surface 56 with a sealing means such as an O-ring O being interposed. The stator chamber 42 is not fluidly connected to the rotor chamber 38 by the O-ring O interposed between the first stator mounting surface 40 and the front end of the stator (102, 104, 108, and 109) and the O-ring O interposed between the second stator mounting surface 56 and the rear end of the stator (102, 104, 108, and 109). Therefore, the coolant having flowed in the rotor chamber 38 does not flow to the stator chamber 42.

The second bearing mounting surface 58 is protruded forwardly from the case surface 52. A second bearing 96 is interposed between the second bearing mounting surface 58 and the rear end portion of the shaft 82 so as to make the shaft 82 smoothly rotate and to prevent the shaft 82 from being inclined.

The rear end of the driver case 50 is open. The driver chamber 64 is formed between the driver case 50 and the driver cover 70 by engaging the driver cover 70 of a disk shape to the rear end of the driver 50 by fixing means such as a bolt B. For this purpose, a protruding portion 72 is protruded forward from an exterior circumference of the driver cover 70, and this protruding portion 72 is inserted in and closely contacted to an exterior circumference 62 of the rear end of the driver case 50. Sealing means such as an O-ring O is interposed between the protruding portion 72 and the exterior circumference 62 so as to prevent foreign substances such as dust from entering the driver chamber 64.

The driver 80 controlling operation of the water pump 1 is mounted in the driver chamber 64. The driver 80 includes microprocessors and a printed circuit board (PCB). The driver 80 is electrically connected to a controller (not shown) disposed at an exterior of the electric water pump 1 through a connector 74 and receives a control signal of the controller. In addition, the driver 80 is electrically connected to the Hall sensor board 110 so as to transmit the control signal received from the controller to the Hall sensor board 110.

Meanwhile, the driver chamber 64 is isolated from the rotor chamber 38 by the case surface 52. Therefore, the coolant in the rotor chamber 38 does not flow into the driver chamber 64.

Since a stator and a rotor that are electrically operated are wrapped by a resin case having waterproof performance according to an exemplary embodiment of the present invention, performance and durability of an electric water pump may improve.

In addition, since a Hall sensor and a Hall sensor board are mounted in the stator and a control signal is changed according to an initial position of the rotor, initial mobility of the electric water pump may improve.

Further, since the coolant flows in a rotor chamber where the rotor is mounted, the rotor may be cooled and foreign materials in the rotor chamber may be removed.

For convenience in explanation and accurate definition in the appended claims, the terms "interior", "exterior", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An electric water pump comprising:
    a stator generating a magnetic field according to a control signal;
    a rotor enclosed by the stator and rotated by the magnetic field generated at the stator;
    a pump cover having an inlet through which coolant flows in and an outlet through which pressurized coolant flows out;
    a body having:
        a front surface forming a volute chamber between the pump cover and the front surface;
        a stator chamber formed at an outer portion of the body in a radial direction and the stator being mounted in the stator chamber; and
        a rotor chamber formed at an inner portion of the body in a radial direction and the rotor being mounted in the rotor chamber;
    a shaft having a central axis, fixed to the rotor so as to rotate together with the rotor about the central axis, and mounted in the rotor chamber; and
    an impeller fixed to a front portion of the shaft so as to rotate together with the shaft, pressurizing the coolant having flowed in through the inlet, and mounted in the volute chamber,
    wherein the rotor chamber is fluidly connected to the volute chamber, and the stator chamber is fluidly closed and sealed from the rotor chamber;
    wherein the stator comprises:
        a stator core formed by stacking a plurality of pieces of a magnetic material;
        an insulator connecting pieces of the stator core to each other;
        a coil coiling the stator core so as to form a magnetic path; and
        a stator case disposed inside the stator chamber and wrapping and sealing the stator core, the insulator, and the coil;
    wherein the stator case is insert-molded with a bulk mold compound including a potassium family that has a low coefficient of contraction; and
    wherein the rotor comprises:
        a rotor core having a hollow cylindrical shape and made of a magnetic material;
        a permanent magnet mounted at an exterior circumference of the rotor core;
        a rotor cover mounted at both distal ends of the rotor core and the permanent magnet so as to fix the rotor core and the permanent magnet together; and
        a rotor case wrapping an exterior circumference of the rotor core and the permanent magnet so as to fix the rotor core and the permanent magnet in a state that the rotor core and the permanent magnet are mounted at the rotor cover.

2. The electric water pump of claim 1, wherein the rotor case is made of a bulk mold compound including a potassium family that has a low coefficient of contraction.

3. The electric water pump of claim 1, wherein a first bearing is disposed between the shaft and the front surface of the body in the rotor chamber and a cup is mounted between the first bearing and the rotor cover on the shaft in order to prevent interference and collision of the shaft and the first bearing by thrust, and a thrust ring is mounted between the cup and the first bearing for smooth rotation of the shaft.

4. The electric water pump of claim 3, wherein the cup is made of a rubber material and the thrust ring is made of a ceramic material.

5. The electric water pump of claim 1, wherein the front portion of the shaft is protruded to the volute chamber through the front surface of the body, and the impeller is fixed in the volute chamber to the front portion of the shaft that is protruded.

6. The electric water pump of claim 1, wherein the pump cover has a slanted surface slanted with reference to the central axis with a predetermined angle, and the impeller has a confronting surface corresponding to the slanted surface at a front end portion thereof, and
    wherein an intersecting point of lines extended from the slanted surface is positioned on the central axis.

7. The electric water pump of claim 1, wherein a first bearing is disposed between the shaft and the front surface of the body in the rotor chamber in order to reduce rotational friction of the shaft.

8. The electric water pump of claim 7, wherein the rotor is formed in an unsymmetrical shape so as to generate thrust toward the front surface of the body.

9. The electric water pump of claim 8, wherein a cup is mounted between the first bearing and the rotor on the shaft in order to prevent interference and collision of the shaft and the first bearing by the thrust, and a thrust ring is mounted between the cup and the first bearing for smooth rotation of the shaft.

10. The electric water pump of claim 9, wherein the cup is made of a rubber material and the thrust ring is made of a ceramic material.

11. The electric water pump of claim 1, further comprising:
    a driver case detachably mounted at a rear end of the body and formed of a driver chamber therein; and
    a driver mounted in the driver chamber and applying the control signal to the stator.

12. The electric water pump of claim 11, wherein the front surface of the body has a first stator mounting surface protruded rearward therefrom, and the driver case has a second stator mounting surface protruded forward from a front surface of the driver case, and
    wherein the stator chamber and the rotor chamber are separately formed by mounting a front end portion of the stator at the first stator mounting surface with sealing means being interposed therebetween and by mounting a rear end portion of the stator at the second stator mounting surface with sealing means being interposed therebetween.

13. The electric water pump of claim 11, wherein a second bearing is disposed between a rear end portion of the shaft and the front surface of the driver case in order to reduce a rotational friction of the shaft.

14. The electric water pump of claim 13, wherein the second bearing is disposed between a stepped portion of the shaft at a rear side of the shaft and the front surface of the driver case in order to reduce the rotational friction of the shaft.

15. The electric water pump of claim 1, wherein the stator further comprises:
- a Hall sensor detecting a position of the rotor; and
- a Hall sensor board controlling the control signal supplied to the stator according to a position of the rotor detected by the Hall sensor.

16. The electric water pump of claim 15, wherein the Hall sensor and the Hall sensor board are also wrapped and sealed by the stator case to form a single body.

\* \* \* \* \*